R. A. Ver Valen,
Brick Press.

Nº 9,082. Patented June 29, 1852.

UNITED STATES PATENT OFFICE.

R. A. VER VALEN, OF HAVERSTRAW, NEW YORK.

BRICK-MACHINE.

Specification forming part of Letters Patent No. 9,082, dated June 29, 1852; Reissued May 10, 1864, No. 1,668.

*To all whom it may concern:*

Be it known that I, R. A. VER VALEN, of Haverstraw, in the county of Rockland and State of New York, have made certain new and useful Improvements in Presses or Machines for Making Bricks; and I do hereby declare that the following is a full, clear, and exact description of the construction and operation of the same, reference being had to the annexed drawings, making a part of this specification, in which—

Figure 1:
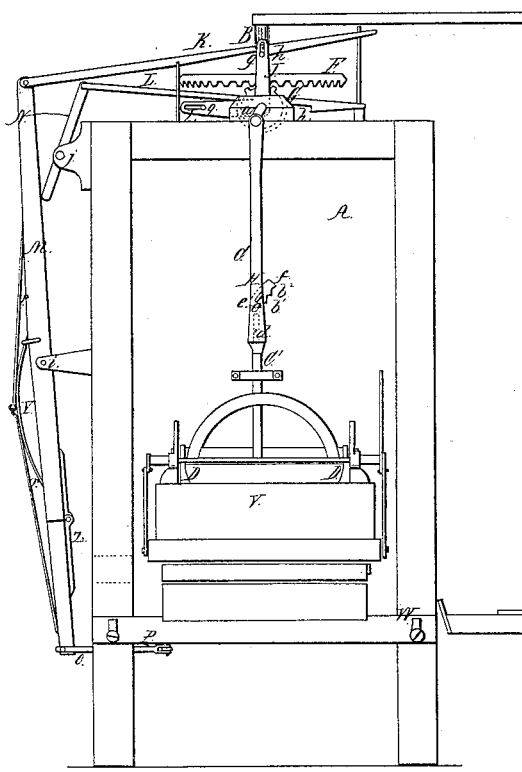
Figure 2:
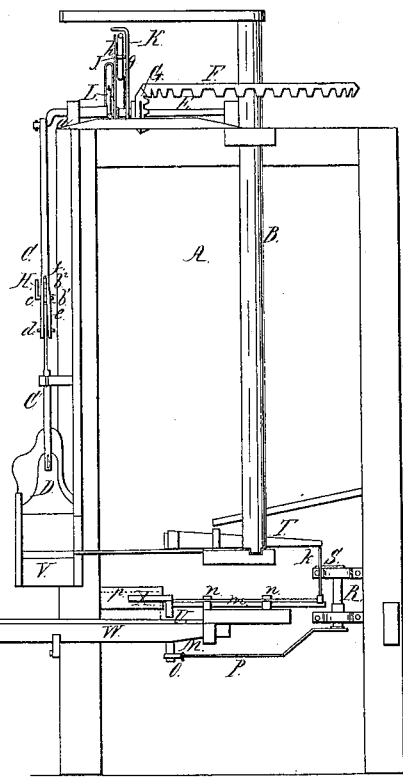
Figure 3:
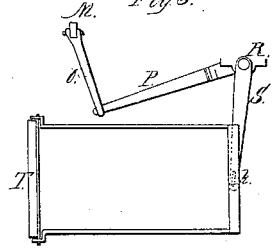
Figure 4:
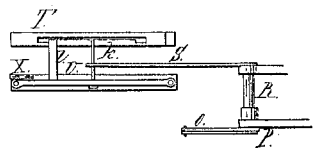

Figure 1, is a front elevation of the machine. Fig. 2, is a side elevation of ditto, the side of the box or case nearest the eye being removed. Fig. 3, is a plan or top view of the feeder and levers, showing the manner in which the feeder is operated, as also the vibrating bar which has the same motion as the feeder and is attached to it. Fig. 4, is a back view in elevation of the feeder, and vibrating bar showing the manner in which the feeder is attached to the vibrating bar.

Similar letters of reference indicate corresponding parts in each of the several figures.

The nature of my invention consists, first, in the employment or use of a lever having steps on its edge for varying the stroke of the plunger or follower, and thereby producing a greater or less pressure of the plunger or follower upon the clay according to its consistency or temper; 2nd, in the use of cranks, rods, and levers, arranged as will be hereafter described, and driven from the main motion, for the purpose of operating the feeder and vibrating bar, the feeder forcing the clay in the molds, and the vibrating bar forcing the molds underneath the press to be filled, and out from it when filled as will be hereafter fully shown; 3rd, in the use of a spring attached and arranged in such a manner, that any obstructing substance in the clay impeding the motion of the molds, will not cause damage to or break any of the working parts or front plate of the press, which latter may be made removable at pleasure; 4th, the attaching together the feeder and vibrating bar so that they have simultaneously the same motion, the vibrating bar having a guide rod working through bearings, or other equivalent device, in combination with an adjustable stop, by which the molds may be placed properly on the bed in front of the vibrating bar.

To enable others skilled in the art to make and use my invention I will proceed to describe fully, its construction and operation.

A, is a case or box having a vertical shaft B, driven by horse, steam, or other power, the case or box may be constructed as ordinary clay, or mud mills, and the shaft B, is provided with the usual blades or arms for working the clay; the arms are not represented, as they are well known and commonly used.

C, is a connecting rod, at the bottom of which, is attached the plunger or follower D, the plunger or follower is worked by a crank ($a$) said crank being at one end of the horizontal shaft E, and attached to the upper end of the connecting rod, see Figs. 1, and 2; the horizontal shaft E, is driven by a bevel wheel F, on the vertical shaft B, working into a bevel pinion G, on the horizontal shaft E.

H, is a lever having step projections ($b'$) ($b^2$) seen more particularly in Fig. 1, and working on a fulcrum ($c$) on the connecting rod C, there is a slot in the connecting rod at the lower end as seen in Fig. 2, in which the lever H, may work; the plunger or follower is connected to this connecting rod by a rod C′, the upper part of which is flattened and fits in the slot in the lower end of the connecting rod C, seen more particularly in Fig. 2, the flattened or upper end of the rod C′, has a slot through it, see dotted lines in Fig. 1, and through this slot a pin ($d$) passes, the pin ($d$) passing through the connecting rod C. Now by turning the lever H, a greater or less stroke may be given the connecting rod as will be readily seen, for instance, if the end $f$, of the lever H, be turned out of the slot in the lower end of the connecting rod C, as seen in Fig. 1, the stroke will be comparatively short because the plunger or follower D, can not be forced down until the opposite end ($e$) of the lever H, comes in contact with the upper surface of the rod C′, and the connecting rod C, is pressed down some distance and also raised up as the crank ($a$) revolves before the connecting rod C, acts upon the rod C′, the plunger or follower being raised when the pin ($d$) reaches the upper part of the slot in the flattened or upper end of the rod C′, the object of the steps ($b'$) ($b^2$) is to give intermediate lengths of stroke, for instance, if the lever H, were turned a little further downward than is represented in Fig. 1, till the first step ($b'$) is within the slot in the lower end of the connecting rod C, a little greater stroke will be obtained and a corresponding increase of stroke if ($b^2$) is within the slot and so on. It will be understood that with an increase of the length of stroke a greater pressure of the plunger or follower on the clay is obtained, and this is desirable for clay requires a greater or less pressure according as it is tempered and the correct pressure may be obtained in a moment of time while the machine is in operation by the operator moving the lever H.

I, J, are two levers or cranks on the horizontal shaft E, placed at right angles to each other see Fig. 1, these levers have pins ($g$) ($g$) projecting from them near their outer ends, and as the levers revolve with the horizontal shaft E, these pins catch or bear against shoulders ($h$) ($h$) on the rods K, L, seen more particularly in Fig. 1, one end of the rod K, is attached by a pivot to the upper end of a vertical lever M, having its fulcrum at ($i$) see Fig. 1, one end of the rod L is attached by a pivot to the upper end of the small lever N, having its fulcrum at ($j$). Now it will be seen that as the horizontal shaft E, revolves, the levers I, J, operate the rods K, L, and these rods give the vertical lever M, a vibrating motion, the rod K, drawing the upper end of the lever M, toward the case or box A, and the rod L, throwing it out, the lower end of the small lever N, acting against the lever M, it being understood that the pins ($g$) ($g$) upon the levers I, J, are relieved from the shoulders ($h$) ($h$) on the rods K, L, when the rods are in the position as indicated by the rod L, Fig. 1, this vibrating motion of the lever M, operates the feeder and vibrating bar. I will proceed to explain this. O, is a horizontal rod attached by a pivot to the lower end of the lever M, the outer end of this rod is attached to a lever P, see Figs. 3, and 4, which is connected to a small upright shaft R, and to this upright shaft there is a lever S, the end of which is attached to an upright or stud ($k$), which is connected to the feeder T, and vibrating bar U, see Fig. 4, the stud ($k$) passing through a slot in the end of lever S, see dotted lines in Fig. 3, to allow for the curvilinear motion of the end of the lever. Now it will be seen that by the arrangement of the levers P, S, rod O, and upright R, a horizontal reciprocating motion is given the feeder and vibrating bar.

The feeder T, vibrates or moves on a portion of the bottom of the box or case A, see Fig. 2, and shoves the clay into the press V, as it is moved forward, the other portion of the bottom of the case is inclined, the front plate of the feeder is hung by pivots on its upper part so that when the feeder is drawn backward the front plate will raise and not draw the clay back with it, when the feeder is shoved forward the front plate will of course fall and press the clay forward into the press, the feeder is connected to the vibrating bar by the standard ($l$), see Fig. 4, and also by the upright or stud ($k$), the standard is omitted in Fig. 2, for the purpose of showing the upright or stud ($k$), the vibrating bar is for the purpose of shoving the molds underneath the press to be fitted with clay by the plunger or follower, it also shoves them out from underneath the press when filled as will be presently seen, the vibrating bar works underneath the bottom of the case or box A, as seen in Fig. 2, and has a guide rod ($m$) Fig. 2, which works through bearings ($n$) ($n$).

The levers I, J, must be placed on the horizontal shaft E, in such a relative position to the crank ($a$) that the feeder and vibrating bar is moved forward while the plunger or follower is rising, so that the clay may be forced into the press underneath the plunger and the vibrating bar throw out the mold from underneath the press V; the molds see dotted lines in Fig. 1, are placed on the bed W, through an opening ($p$) in the side of the box or case, see Fig. 2, and directly before the vibrating bar, when the vibrating bar is shoved forward the mold is forced underneath the press, and when it is moved backward another mold is placed through the opening ($p$) and in front of the vibrating bar which as it is moved forward causes the fresh mold to throw out the mold that was formerly put before it and the fresh mold remains under the press till the clay it contains is pressed by the plunger, it being understood that the plunger is depressed while the feeder and vibrating bar are thrown back. There is another item to be explained, and that is the method by which the return or back motion is given the feeder and vibrating bar, it is of course seen that this is accomplished by the rod L, and small lever N, but it must be borne in mind that the lower end of the lever N, bears upon the vertical lever M, at a point nearer the fulcrum ($i$) than the pivot or point of attachment of the rod K, consequently the return or back motion of the vibrating bar will be quicker than the forward motion, this is necessary in order to allow the operator time to place the molds on the bed, the arrangement or the manner in which the levers I, J, are placed on the horizontal shaft E also causes the vibrating bar to stop a short time when back, because when the pin ($g$) on the lever I, is relieved from the shoulder ($h$) on the rod L, and the vibrating bar thrown back the lever J, has to make half a revolution before it acts upon the rod K, and the vibrating bar is thrown forward.

X, is an adjustable stop attached to one end of the vibrating bar, see Fig. 2, this prevents the molds from being placed improperly on the bed, this stop may be adjusted so as to suit different sized molds or those of different lengths; being attached to the vibrating bar it moves with it and consequently the molds are not bruised or worn by friction, as is the case where the stop is attached to some portion of the bed, the stop is merely a ledge or projection set out at a right angle from the face of the vibrating bar, and the end of the molds are placed against it when put on the bed, the stop may be shifted or moved by set screws or by any other equivalent.

Y, is a spring, bow shaped, the ends of which are attached to the vertical lever M, see Fig. 1, ($r$) ($r$) are two small rods connected or hooked together and resting on or against the outer surface of the spring as seen in the figure the ends of the rods are secured to the lever, the lever M, is divided and connected by a hinge joint Z, and the lower rod ($r$) is attached to the lever M, below the hinge Z, now if any obstruction, such as a stone for instance, should be in the clay and be forced down in the mold the stone being sufficiently high or large to prevent the mold from being forced out from underneath the press V, by the vibrating bar, the strain will not act hard upon the lever M, or other parts of the machinery because the spring Y, by its elasticity will give or yield and sufficient warning will be given the operator to remove the obstruction, which may be done by stopping the motion, or raising the front plate of the press.

The usual method of feeding the clay in the press is by scrapers or arms attached to the vertical shaft, the scrapers resting on the bottom of the case or box, the disadvantage of this arrangement, is, the feed is not regular, or the clay is forced into the press at wrong times, it is just as likely to be forced into the press when the plunger is down as when it is up, this disadvantage I have obviated as has been shown, I am also, by employing the lever H, enabled to give the clay the proper pressure according to its consistency or temper and by the use of the spring Y, the breaking of the working parts of the machine is prevented in case of any obstruction, the method also of working the feeder and vibrating bar, is simple and efficient, time being given the operator to insert the molds before the vibrating bar is moved forward.

I do not claim the plunger or follower operated by a connecting rod and crank, as that is well known, but

What I claim as new and desire to secure by Letters Patent, is—

1. The employment or use of the lever H, having step projections ($b'$) ($b^2$) on one of its sides, attached to the connecting rod C, and arranged as shown and described, by which, a greater or less pressure of the plunger or follower upon the clay in the molds is obtained as desired.

2. I claim the arrangement of the levers I, J, N, rods K, L, vertical lever M, and the rod O, with the levers P, S, and upright shaft R, for the purpose of operating the feeder T, and vibrating bar U, substantially as set forth.

3. I claim the employment or use of the spring Y, attached to the vertical lever M, and operated upon by the rods ($r$) ($r$) attached to the lever whereby the working of the machine is prevented by any obstruction as described.

4. I claim the attaching together of the feeder T, and vibrating bar U, the vibrating bar having a guide rod ($m$) working in suitable bearings ($n$) ($n$) or arranged in any other suitable way.

R. A. VER VALEN.

Witnesses:
S. H. WALES,
THOS. MAHON.

[FIRST PRINTED 1912.]